(12) United States Patent  (10) Patent No.: US 6,281,431 B1
Cumley  (45) Date of Patent: Aug. 28, 2001

(54) MULTI-CORE CABLE AND CABLE JOINT

(75) Inventor: Roy Alan Frank Cumley, Eastleigh (GB)

(73) Assignee: Birelli General plc, London (GB)

( * ) Notice: Subject to any disclaimer, the term of this patent is extended or adjusted under 35 U.S.C. 154(b) by 0 days.

(21) Appl. No.: 09/038,630

(22) Filed: Mar. 12, 1998

(30) Foreign Application Priority Data

Mar. 14, 1997 (GB) .................................................. 9705380

(51) Int. Cl.$^7$ ...................................................... H01B 9/06
(52) U.S. Cl. ....................... 174/25 G; 174/84 R; 385/101
(58) Field of Search ................................. 174/25 G, 26 G, 174/21 R, 84 R, 47; 385/134, 135, 139, 101, 100

(56) References Cited

U.S. PATENT DOCUMENTS

| | | | |
|---|---|---|---|
| 5,418,878 | * 5/1995 | Sass et al. ............................. | 385/101 |
| 5,455,881 | * 10/1995 | Bosisio et al. ....................... | 385/100 |
| 5,467,420 | 11/1995 | Rohrmann et al. . | |

FOREIGN PATENT DOCUMENTS

| | | |
|---|---|---|
| 42 40 170 | 6/1994 | (DE) . |
| 0 274 228 | 7/1988 | (EP) . |
| 0 646 817 | 4/1995 | (EP) . |
| 0933786 A | 8/1999 | (EP) . |
| 448511 | 6/1936 | (GB) . |
| 2 302 184 | 1/1997 | (GB) . |
| 58-42010 | 3/1983 | (JP) . |
| 8-223765 | 8/1996 | (JP) . |
| WO 96/02081 | 7/1995 | (WO) . |

\* cited by examiner

*Primary Examiner*—Chau N. Nguyen
(74) *Attorney, Agent, or Firm*—Finnegan, Henderson, Farabow, Garrett & Dunner, L.L.P.

(57) ABSTRACT

A cable joint for a multi-core cable including an outer sheath, at least one electric pilot line, at least one optical fiber line, and several cable cores. Both the electric pilot line and the optical fiber line are disposed in protective tubing. Each of the cores of the cable is electrically connected to respective cores of another electric cable, and the connection between the respective cores resides within a casing. Additionally, the electric pilot line, optical fiber, and protective tubing elements of the cable are connected to the corresponding structures of the other electric cable. The connection of these structures resides outside of the casing.

23 Claims, 7 Drawing Sheets

MULTI-CORE CABLE AND CABLE JOINT

BACKGROUND OF THE INVENTION

The invention relates to a multi-core electric cable, which cable has an outer sheath which surrounds at least one electric pilot line and/or at least one optical fibre line and/or tube therefor in addition to the cores of the cable, and to a cable joint comprising an end portion of such a cable, each of the cores of the cable being electrically connected to respective cores of another electric cable or electric cables within a casing. Particularly, but not exclusively, the invention relates to high voltage oil filled power cables, eg 132 kV power cables, and such joints therefor.

High voltage, eg 132 kV, cable installations including oil filled cables often include low voltage pilot lines for powering switching alarms and oil pressure alarms, for example. Recent developments have resulted in the inclusion of optical fibre communications lines alongside power cables, for example in the same trench as the cables, and the inclusion of optical fibre temperature sensing lines providing a distributed temperature sensing capability for monitoring the temperature of an operating cable along its length, which sensing lines may be taped along or helically around the cable oversheath.

BRIEF SUMMARY OF THE INVENTION

According to an aspect of the present invention, there is provided a cable joint comprising an end portion of a multi-core electric cable which cable has an outer sheath which surrounds at least one electric pilot line and/or at least one optical fibre line and/or tube therefor in addition to the cores of said cable, each of the cores of the cable being electrically connected to respective cores of another electric cable or electric cables within a casing, the or each electric pilot line and/or the or each optical fibre line and/or tube therefor being connected to a like line or tube outside said casing.

The joint may be a straight-through joint interconnecting two multi-core cables.

The joint may be a transition joint and may comprise the end portion of one oil filled multi-core electric cable, the end portion of one non-oil-filled multi-core electric cable and barrier means, the casing containing oil only to the side of the barrier means closest to said oil filled cable.

According to another aspect of the present invention, there is provided a cable joint comprising an end portion of a multi-core oil filled electric cable which cable has an outer sheath which surrounds at least one electric pilot line and/or at least one optical fibre line and/or tube therefor in addition to the cores of said cable, each of the cores of the cable being electrically connected to respective cores of another electric cable or electric cables within an oil filled casing, the or each electric pilot line and/or the or each optical fibre line and/or tube therefor being connected to a like line or tube outside said casing.

Preferably, the casing comprises a first casing portion for encasing connections between said cores, a second, end casing portion for encasing the cores and the or each line of said electric cable, and a stepped portion interconnecting said first casing portion and said end casing portion, the or each electric pilot line and/or the or each optical fibre line and/or tube therefor extending through the stepped portion.

The stepped portion may be provided by a flange which extends laterally, relative to a longitudinal axis of the casing, between adjacent respective ends of said first casing portion and said end casing portion.

The end casing portion may have an inwardly facing surface which extends in the direction of a longitudinal axis of the casing, said inwardly facing surface having a substantially circular cross-section taken laterally of said longitudinal axis of the casing.

The first casing portion may have an outwardly facing surface which extends in the direction of a longitudinal axis of the casing, said outwardly facing surface having a cross-section, taken laterally of said longitudinal axis of the casing, in the form of a substantially equilateral three sided figure, each side of the figure having a substantially straight side-portion intermediate arcuate end side-portions.

Preferably, said first casing portion and said end casing portion are i) disposed such that the geometrical centres of their respective lateral cross sections are aligned in the direction of the longitudinal axis of the casing, and ii) dimensioned such that, if their respective lateral cross-sections are superimposed one upon the other, the substantially circular lateral cross-section of the end casing portion circumscribes the three sided figure formed by the first casing portion in lateral cross-section.

Preferably, the flange extends substantially perpendicularly to the longitudinal axis of the casing such that the stepped portion comprises three segment-shaped steps.

The first casing portion may be disposed intermediate two adjacent said end casing portions, and two respective said stepped portions may interconnect the first casing portion and respective ones of said end casing portions.

The joint may be a straight-through joint and comprise the end portions of two said multi-core oil filled electric cables, respective conductors of the cores of the respective cable end portions extending within the intermediate first casing portion, and the or each electric pilot line and/or the or each optical fibre line and/or tube therefor of each of the respective cable end portions extending through a respective one of said stepped portions.

The joint may be a branch joint and comprise the end portion of said multi-core oil filled electric cable and the end portions of a plurality of single core oil filled electric cables, respective conductors of the cores of the respective multi-core and single core cable end portions extending within the intermediate first casing portion, the or each electric pilot line and/or the or each optical fibre line and/or tube therefor of said multi-core cable extending through one of said stepped portions, and any said like line or tube associated with said single core cables extending through the other of said stepped portions.

The cores of one said multi-core electric cable may be connected to the respective cores of another electric cable or other electric cables by means of respective ferrules.

The joint may be a stop joint and comprise the end portions of two said multi-core oil filled electric cables, respective cores of the two cable end portions being connected to opposite ends of respective electrodes which extend within said first casing portion, the or each electric pilot line and/or the or each optical fibre line and/or tube therefor of each of the respective cable end portions extending through a respective one of said stepped portions.

The intermediate first casing portion may comprise two casing sections connected to opposite ends of barrier means, said electrodes extending through said barrier means within said first casing portion.

According to another aspect of the present invention, there is provided a multi-core oil filled cable having a outer sheath which surrounds at least one electric pilot line and/or at least one optical fibre line in a respective tube therefor in addition to the cores of said cable.

The or each optical fibre line may comprise at least one communications line and/or at least one temperature sensing line.

BRIEF DESCRIPTION OF THE DRAWINGS

In order that the invention may be better understood, three embodiments thereof will be described herein, by way of example only, with reference to the accompanying drawings, in which.

DETAILED DESCRIPTION OF THE INVENTION

Figure 1:
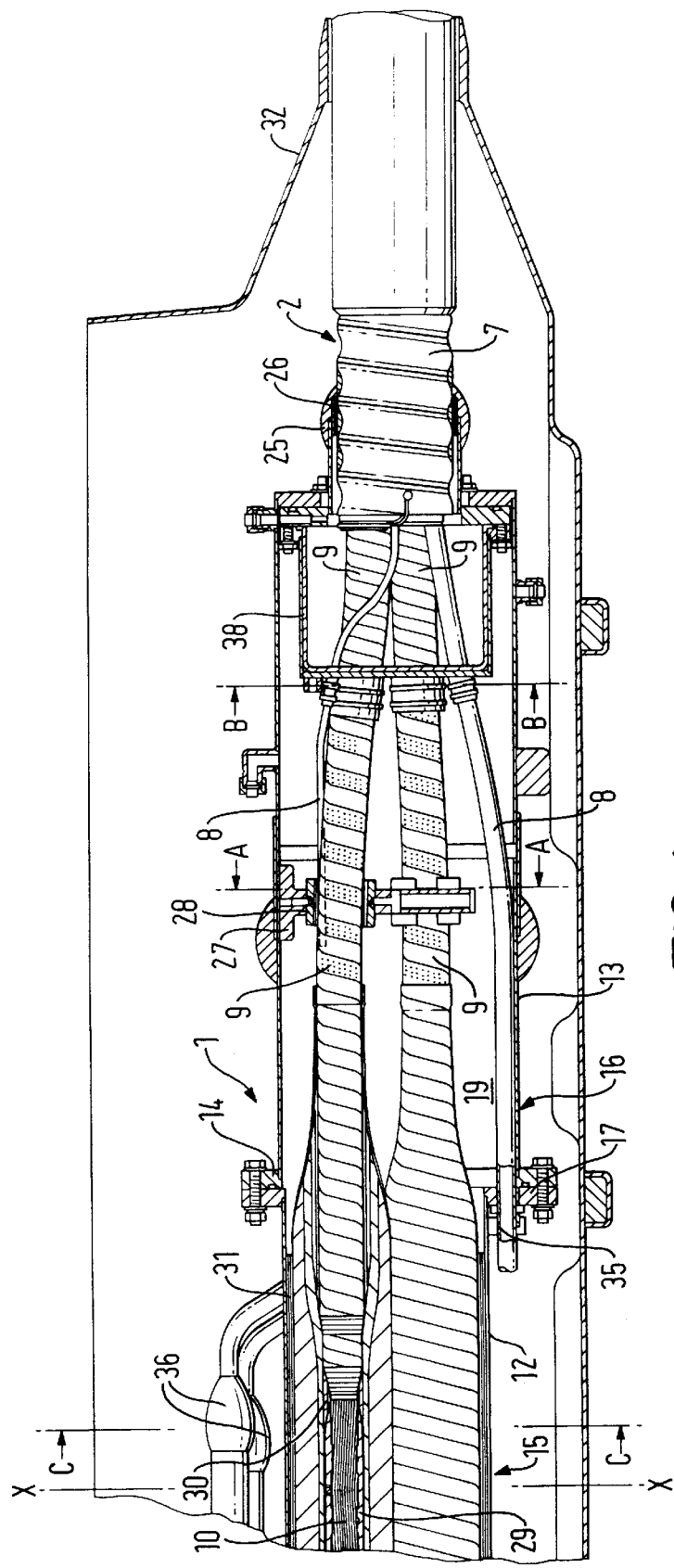
FIG. 1 is a side view of a longitudinal cross-section through one half of a cable joint of the straight-through type.
Figure 2:
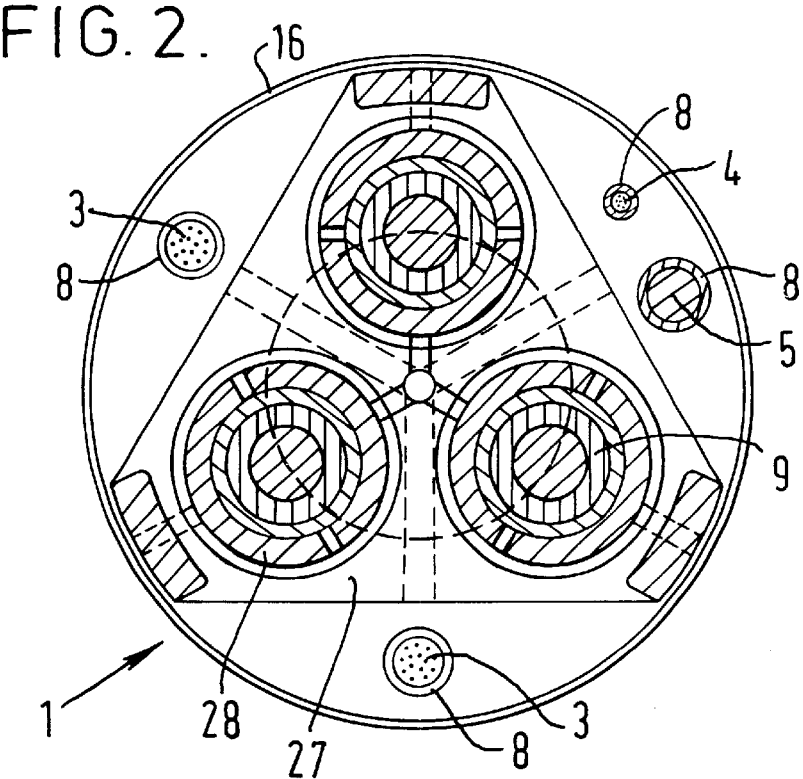
FIG. 2 is a view of a lateral cross-section through the joint shown in FIG. 1 along arrows A—A in FIG. 1.
Figure 3:
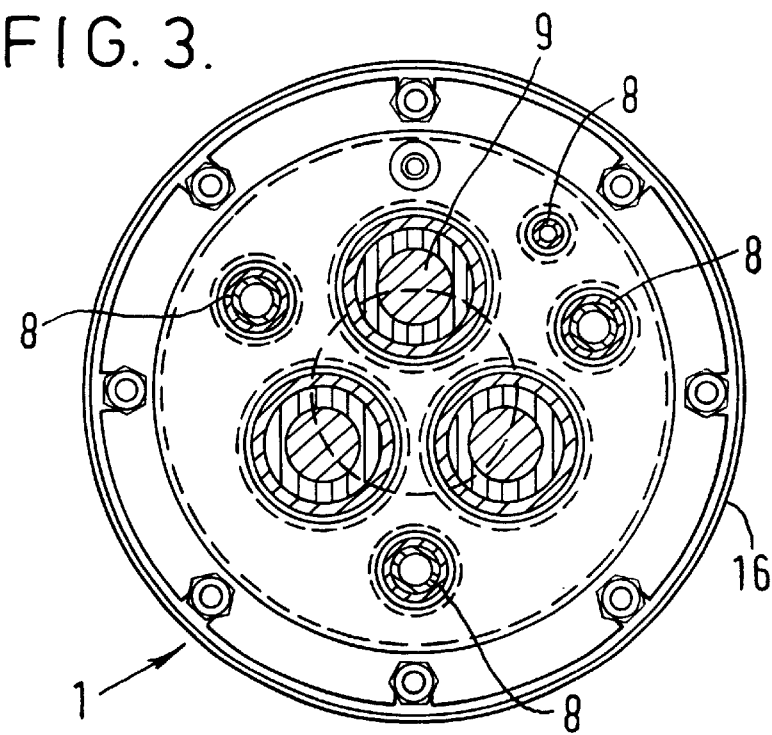
FIG. 3 a view of a lateral cross-section through the joint shown in FIG. 1 along arrows B—B in FIG. 1.

Referring now to FIGS. 1 to 4 of the accompanying drawings, FIG. 1 shows one half of a cable joint indicated generally as 1. The joint is substantially symmetrical about a centre line x—x. The joint 1 is a straight-through joint and comprises the end portions of two three-core self contained oil filled electric cables 2, only one of which is shown in FIG. 1, and an oil filled joint casing. The cores 9 of one of the cables 2 are electrically and mechanically connected to respective cores 9 of the other of the cables 2 within the casing.

Each cable 2 has an outer sheath which surrounds two optical fibre communications lines 3, a temperature sensing optical fibre line 4 and a low voltage, eg 240 volt, electric pilot line 5. The aforementioned lines 3, 4 and 5 are located in respective protective metal tubes 8 disposed within the cable 2 in interstices between the three cable cores 9. The cable outer sheath of each of the three-core cables 2 comprises a corrugated aluminium sheath 7 with a protective sheath of high or medium density polyethylene or polyvinylchloride extruded thereover. The protective metal tubes 8 are of aluminium or stainless steel, for example, and provide chemical, physical and mechanical protection for the respective optical fibre lines and the electric pilot line within the oil filled environment of the three-core cables 2 and the joint 1.

The optical fibre lines 3, 4 are placed within the protective metal tubes 8 during manufacture of the cables. However, the optical fibre lines 3, 4 may alternatively be inserted into the metal tubes 8 after cable installation using, for example, the blown fibre technique described in the applicant's copending UK patent application number 9521776.6, Publication GB 2308019A.

The joint casing comprises a first casing portion 15 disposed intermediate two end casing portions 16. The first casing portion 15 has a respective flange 17 at each opposite axial end thereof, each flange 17 extending substantially perpendicularly to a central axis of the joint 1 indicated by the intersection of lines Y—Y and Z—Z shown on FIG. 4. Each end casing portion 16 has a respective flange 14 at one of its axial ends, each flange 14 extending substantially perpendicularly to the central axis of the joint 1. Each end of the intermediate first casing portion 15 is connected to an adjacent end of a respective one of the end casing portions 16 by means of the respective flanges 14, 17.

Figure 4:
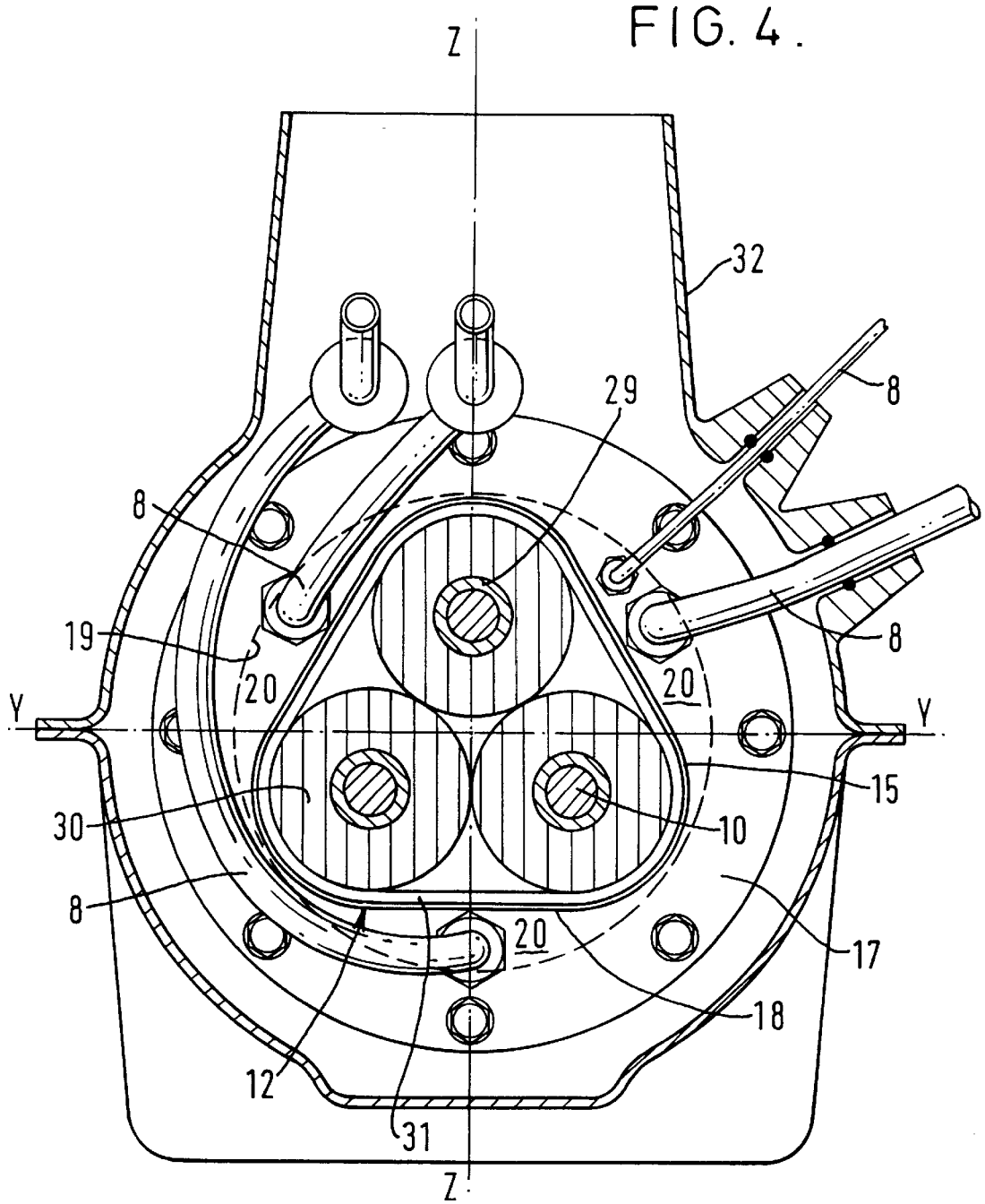
FIG. 4 is a view of a lateral cross-section through the joint of FIG. 1 along arrows C—C in FIG. 1.
Figure 5:
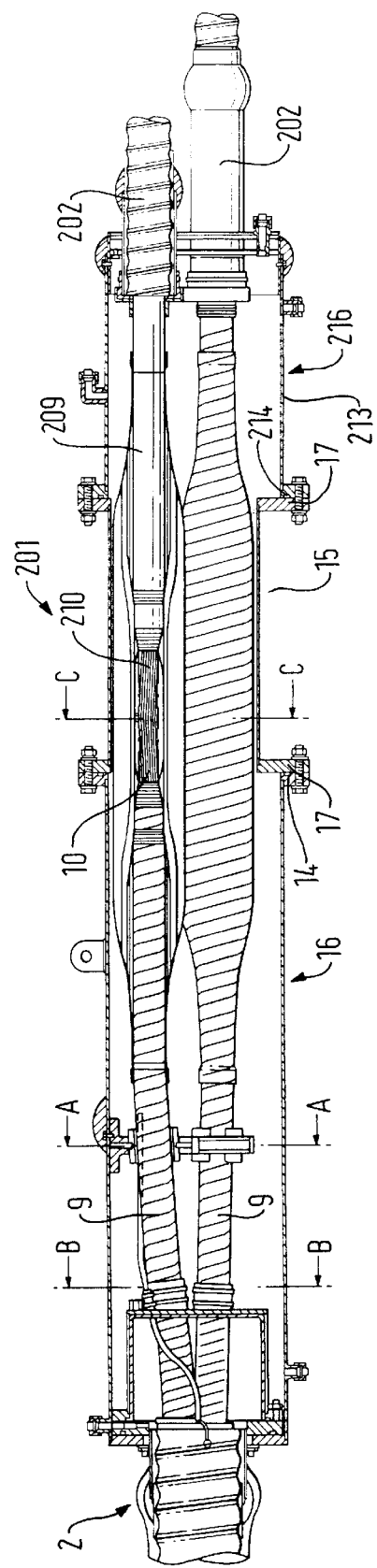
FIG. 5 is a side view of a longitudinal cross-section through a trifurcating joint.
Figure 6:
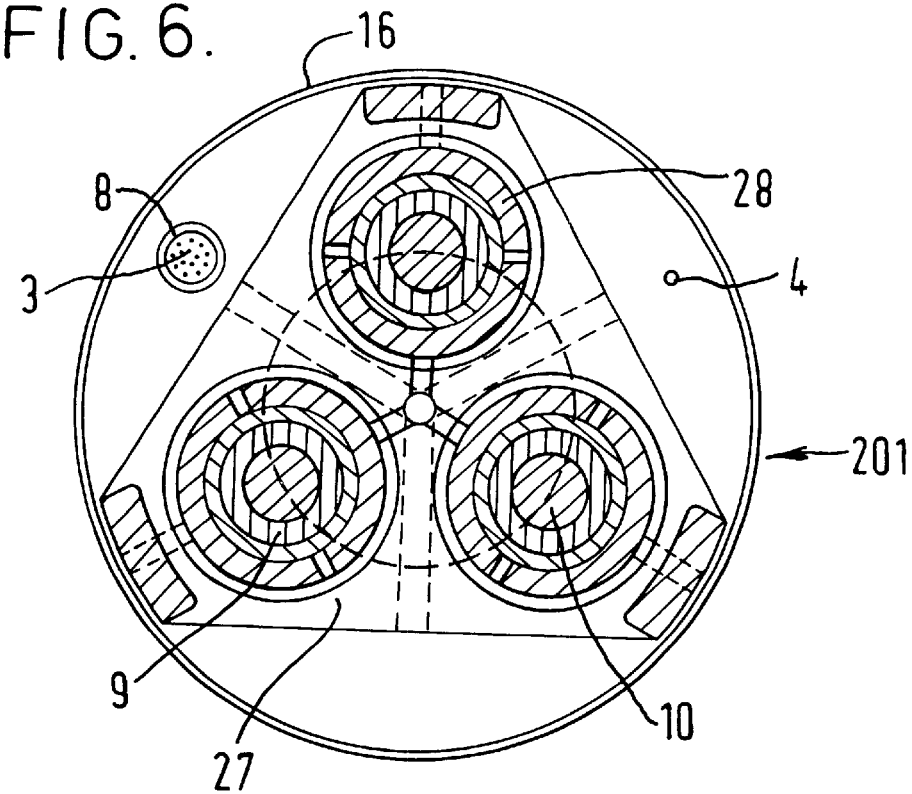
FIG. 6 is a view of a lateral cross-section through the joint of FIG. 5 along arrows A—A in FIG. 5.
Figure 7:
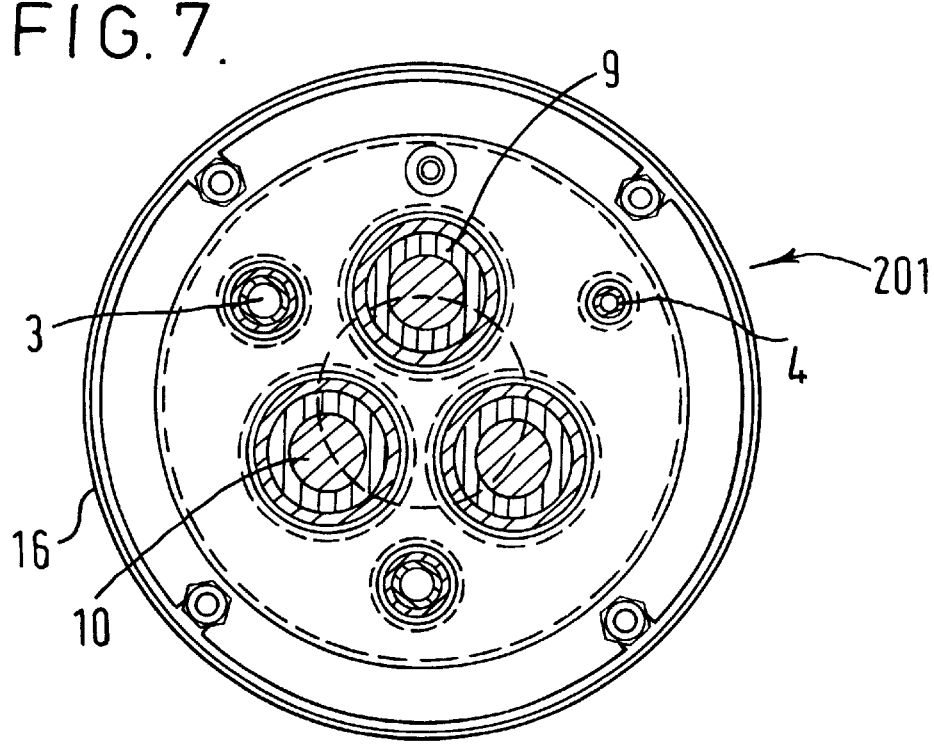
FIG. 7 is a view of a lateral cross-section through the joint of FIG. 5 along arrows B—B in FIG. 5.
Figure 8:
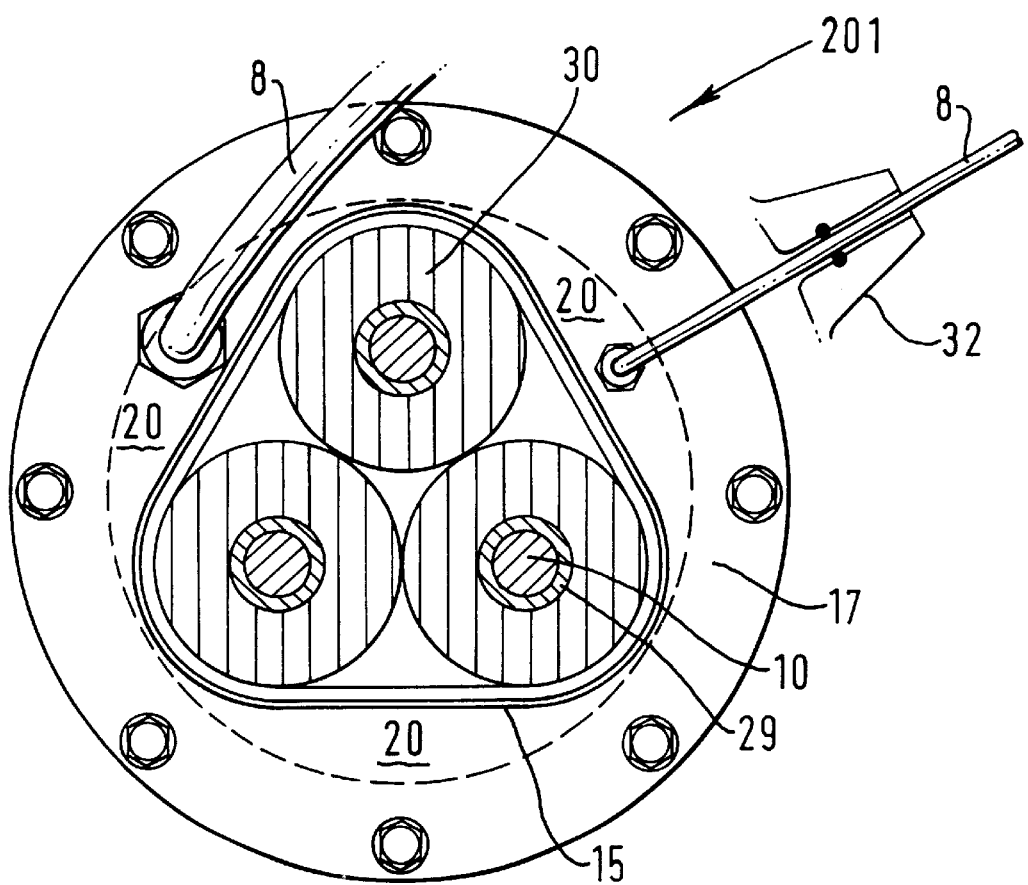
FIG. 8 is a view of a lateral cross-section through the joint of FIG. 5 along arrows C—C in FIG. 5.

As best seen in FIG. 4, the first casing portion 15 has sleeve portion 12 having a circumferentially extending surface 18 which faces laterally outwardly with respect to the central longitudinal axis of the joint 1, and extends in the direction of that axis ("axially"). The outwardly facing surface 18 has a lateral cross-section in the form of a substantially equilateral triangle with rounded corners.

Each end casing portion 16, on the other hand, has a respective sleeve portion 13 having a surface 19 which faces laterally inwardly with respect to the above-mentioned longitudinal axis and extends axially and circumferentially. The end casing portion's inwardly facing surface 19 has a substantially circular lateral cross-section. As shown in FIG. 4, the relative sizes, dispositions and dimensions of the first casing portion 15 and end casing portions 16 are such that, viewed from an axial end of the joint 1, the circles defined by the end casing portions' respective inwardly facing surfaces 19 circumscribe the above-mentioned three sided figure defined by the intermediate casing portion's outwardly facing surface 18. A respective stepped portion comprising three segment-shaped steps 20 is thereby formed by each flange 17 of the first casing portion 15.

It will be readily apparent to a skilled reader that stepped portions of various shapes and sizes can be obtained by varying the relative shapes, sizes and dispositions of the casing portions 15, 16. For example, the intermediate first casing portion 15 may have a sleeve portion having an outwardly facing surface which has a substantially circular crosssection of smaller diameter than the circle defined by each end casing portion's inwardly facing surface, whereby annular stepped portions are formed.

The three-core cable 2 shown in FIG. 1 has its outer sheath cut back, and a seal is formed at the joint end between an exposed end portion of the aluminium sheath 7 and the end casing portion 16 using a wiped joint 25 and strip packing 26.

The cores 9 extend from the cable outer sheath into the casing 15, 16 and are supported in a laterally spread-apart condition by a core spreader 27 provided with jaws 28 for clamping the respective cores 9. The conductors 10 of the cores 9 extend within the intermediate casing portion 15, where the screening and insulation is removed from the individual core ends and the conductors 10 are electrically and mechanically connected to the respective conductors 10 of the other three-core cable 2 by means of ferrules 29. Tape insulation 30 is applied about the interconnected conductors 10 and a paper tube core binding support 31 is disposed around the insulated interconnected conductors 10 which are adjacent one another and closely packed within the sleeve portion 12 of the intermediate first casing portion 15. The sleeve portion 12 is made of copper.

The metal tubes 8 containing the electric pilot line 5 and optical fibre lines 3, 4 extend from the cable 2 outer sheath into the end casing portion 16 where they are led laterally away from the cores 9 and through respective sealing glands 35 in respective ones of the steps 20. The sealing glands 35 are resin sealed. The electric pilot line 5, the optical fibre lines 3, 4 and the metal tubes 8 are joined to like lines and tubes of the other three-core cable 2 outside the casing. The like lines and tubes re-enter the casing by means of sealing glands in segment-shaped steps formed by the flange of the corresponding end casing portion (not shown). The tubes 8 are joined by epoxy resin joints 36. The tubes 8 are provided with insulation over the axially extending portions thereof which lie outside the casing, and the tube joints 36 are similarly insulated. This provides a degree of safety to persons handling or touching the tubes 8 from currents induced in the tubes 8 when the conductors 10, 210 are live. This insulation is not shown in the drawings.

The tube and line joints are protected from chemical and physical damage to which they could be susceptible if they were in the pressurised oil environment inside the casing 15, 16, and are protected by the copper sleeve 12 from electrical stresses which arise in the region of the conductor connections. Furthermore access to the tube and line joints in a cable installation, for example for making branch line connections and repair and replacement of the electric pilot line 5 and/or optical fibre lines 3, 4, is facilitated.

Provision of the steps 20 also facilities arrangement of the metal tubes 8 and the electric pilot line 5 and optical fibre lines 3, 4 such that they exit the casing 15, 16 without a sharp change in direction which might cause undesirable stresses, particularly in the optical fibre lines 3, 4.

The cable joint 1 is enclosed in a fibre glass joint box 32 filled with a filler such as resin and/or bitumen. The electric pilot line 5 and the temperature sensing line 4 exit the fibre glass joint box 32, thereby further facilitating access to the line joints, for example for the making of branch connections leading to apparatus remote from the cable joint or for repair or replacement of the lines. These lines continue to be protected by protective metal tubes 8 as shown in FIG. 4.

The intermediate first casing portion 15 is designed to be as short as possible to facilitate passing the portion 15 back along one of the cables 2 until the conductors 10 of the cable cores 9 are interconnected and insulated during installation of the cable joint 1, the portion 15 thereafter being positioned over the interconnected and insulated conductors 10.

An oil retaining glove 38 with a copper reinforcing sleeve is provided to retain oil within the oil filled cable 2 whilst making the joint 1.

Referring now to FIGS. 5 to 8, a cable joint 201 for carrying out the functions of a branch cable joint of the trifurcating type is shown. Items which are similar to corresponding items described with respect to FIGS. 1 to 4 are designated by similar reference numerals and, to avoid repetition, are not described again in detail.

The joint 201 comprises the end portion of a three-core self contained oil filled electric cable 2 of similar construction to the aforementioned cables 2, the end portions of three single core oil filled electric cables 202 and an oil filled joint casing. Each cable 202 has a single core 209 including an electrical conductor 210. For convenience, only the optical fibre temperature sensing line 4 and one of the optical fibre communications lines 3 are shown. The cores 9 of the three-core cable 2 are electrically connected to the respective cores 209 of the single core cables 202. Specifically, the electrical conductors 10 of the three-core cable 2 are electrically and mechanically connected to the respective electrical conductors 210 of the single core cables 202 within the oil filled casing by means of respective ferrules 29.

The joint casing comprises a first casing portion 15 disposed intermediate two end casing portions 16, 216. The end casing portion 216 comprises a sleeve portion 213 and flange 214, and is shorter than the end casing portion 16 because there is no requirement to spread the cores 209 of the single core cables 202 laterally apart before they enter the intermediate first casing portion 15. Each end of the intermediate first casing portion 15 is connected to an adjacent end of a respective one of the end casing portions 16 and 216 by means of the respective flanges 14, 17 and 214, 17.

The sizes, relative dispositions and cross-sectional shapes of the casing portions 15, 16 and 216 are similar to those of the joint shown in FIGS. 1 to 4, thereby providing a stepped portion having three segment-shaped steps 20. The electric pilot line (not shown), optical fibre lines 3, 4 and their respective protective metal tubes 8 pass through the stepped portion formed by the flange 17 interconnecting the longer end casing portion 16 and the first casing portion 15. These lines 3, 4, and tubes 8 are joined to like lines and tubes (not shown) outside the first casing portion 15. At least one of these lines 3, 4 and tubes 8 is led away from the joint 201 and through the fibre glass joint box 32. At least one of the like lines (not shown) and tubes (not shown) may pass through the stepped portion formed by the flange 17 interconnecting the shorter end casing portion 216 and the first casing portion 15 and continue via the end of the casing in association with a respective one of the single core cables 202.

Figure 9:
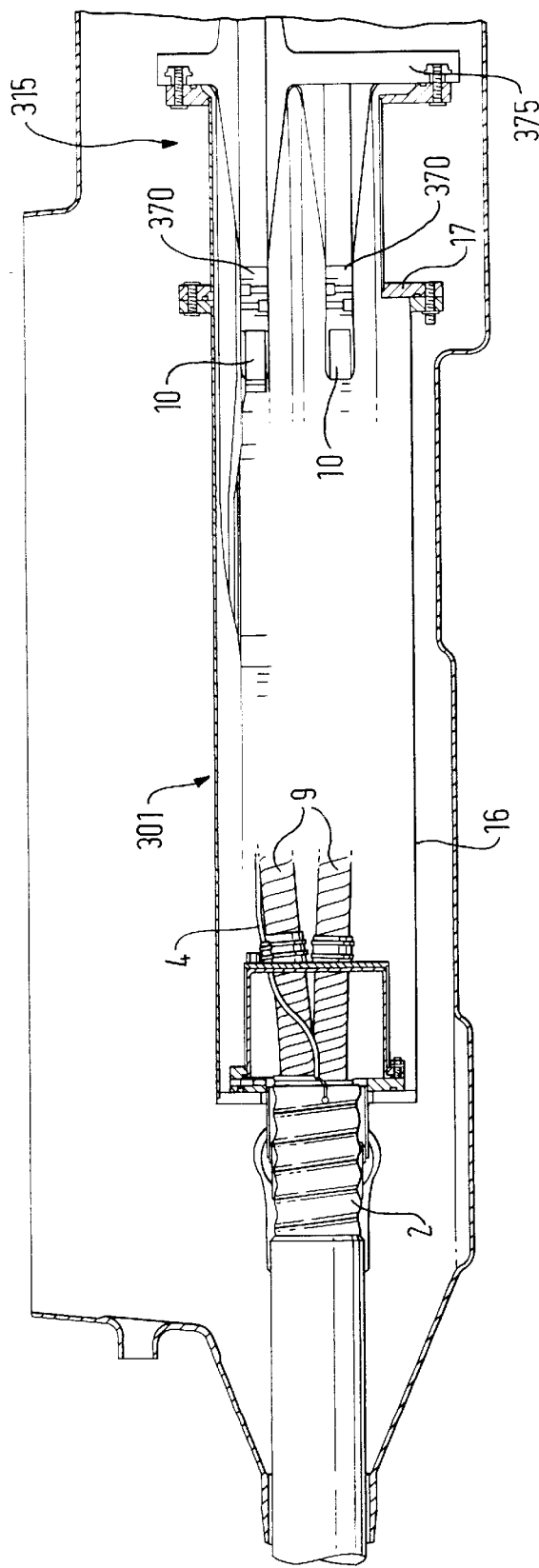
FIG. 9 is a side view of a longitudinal cross-section through one half of a stop joint.

Referring now to FIG. 9, one half of a stop joint 301 is shown. Again, items which are similar to corresponding items described with respect to FIGS. 1 to 8 are designated by similar reference numerals and, to avoid repetition, are not described again in detail.

The joint 301 comprises the end portions of two three-core self-contained oil filled cables 2 of similar construction to the aforementioned cables 2, and an oil filled casing. The conductors 10 of the respective cores 9 of the two cable end portions are electrically and mechanically connected to opposite ends of respective electrodes 370. The electrodes 370 extend axially within a first casing portion 315 which is disposed intermediate two end casing portions 16. The intermediate first casing portion 315 comprises two axially extending sections connected to opposite axial ends of a centre barrier 375 formed of a cured epoxy resin for example a silica filled epoxy resin. The electrodes 370 extend through the barrier to electrically interconnect the two cables 2 whilst the barrier 375 prevents hydraulic continuity between the respective oil masses inside the casing on opposite sides of the barrier 375. A spreader (not shown) is conveniently provided in each end casing portion 16 for spreading the cores 9 of each cable 2.

The two optical fibre communications lines (not shown), the electric pilot line (not shown) the optical fibre temperature sensing line 4 and the metal tubes theref or of each three-core cable 2 exit the casing through respective sealing glands (not shown) in the stepped portions provided by the respective flanges 17 and are interconnected outside the casing.

The last above-described arrangement is particularly advantageous in a stop joint because it obviates the requirement to provide sealing means to enable the electric pilot line, the optical fibre lines and the tubes therefor to pass through the barrier 375, thus facilitating maintenance of the integrity of the barrier 375. Also, the integrity of the metal tube joints and the line joints is not adversely affected by contact with the oil inside the casing.

A multi-core cable 2 as hereinbefore described is particularly advantageous in facilitating cable installation in difficult cable-installing areas, for example inside steel pipe which may be already laid to accommodate old gas compression cables. This cable construction also provides additional protection, particularly during installation, to the electric pilot line and optical fibre lines since they are disposed within the sheath of the cable.

The above-described cable joints 1, 201, 301 facilitate effective sealing of electric pilot line joints and optical fibre line joints, provide easy access to such joints for facilitating the making of branch connections and repair or replacement of the lines 3, 4, 5, and enable the lines 3, 4, 5 to penetrate the casing whilst facilitating maintenance of the sealing integrity of the casing.

The skilled person will appreciate from the above described examples that many variations are possible which fall within the scope of the claims. For example, the cable joint may be a transition joint interconnecting an oil filled cable and a non-oil-filled cable and have a casing which is provided with barrier means and electrodes similar to those in the stop joint described with reference to FIG. 9, the casing containing oil to one side of the barrier means only. Alternatively, the joint may interconnect non-oil-filled cables, a casing being provided inter alia to protect the cable end portions from undesirable contact with fluids and other material in the vicinity of the joint. Non-oil-filled cables may, for example, be of the elastomeric insulated type or impregnated paper insulated type.

What is claimed is:

1. A cable joint comprising an end portion of a multi-core electric cable, said cable having an outer sheath which surrounds at least one electric pilot line, at least one optical fiber line, tubes for the at least one electric pilot line and the at least one optical fiber line, and the cores of said cable;

each of the cores of the cable being electrically connected to respective cores of another electric cable or electric cables within a casing;

the at least one electric pilot line, the at least one optical fiber line, and the tubes being connected to similar structures in the other electric cable or electric cables, the connections being made outside said casing; and wherein said joint is a transition joint and further comprises a barrier means disposed between the multi-core electric cable, which comprises an oil filled multi-core electric cable, and the other electric cable, which comprises a non-oil-filled multi-core electric cable; and wherein oil is contained within the casing only to the side of the barrier means closest to said oil filled cable.

2. A cable joint comprising an end portion of a multi-core oil filled electric cable, said cable having an outer sheath which surrounds at least one electric pilot line, at least one optical fiber line, tubes for the at least one electric pilot line and the at least one optical fiber line, and the cores of said cable, each of the cores of the cable being electrically connected to respective cores of another electric cable or electric cables within an oil filled casing, the at least one electric pilot line, the at least one optical fiber line, and the tubes being connected to similar structures in the other electric cable or electric cables, the connections being made outside said casing, wherein said casing comprises a first casing portion for encasing connections between said cores; an end casing portion for encasing the cores, the at least one electric pilot line, and the at least one optical fiber line; and a stepped portion interconnecting said first casing portion and said end casing portion, wherein the at least one electric pilot line, the at least one optical fiber line, and the tubes extend through the stepped portion.

3. A cable joint comprising an end portion of a multi-core electric cable, said cable having an outer sheath which surrounds at least one electric pilot line, at least one optical fiber line, tubes for the at least one electric pilot line and the at least one optical fiber line, and the cores of said cable, each of the cores of the cable being electrically connected to respective cores of another electric cable or electric cables within a casing, the at least one electric pilot line, the at least one optical fiber line, and the tubes being connected to similar structures in the other electric cable or electric cables, the connections being made outside said casing, wherein the at least one optical fiber line comprises at least one communications line and at least one temperature sensing line.

4. A cable joint comprising an end portion of a multi-core electric cable, said cable having an outer sheath which surrounds at least one electric pilot line and the cores of said cable, each of the cores of the cable being electrically connected to respective cores of another electric cable or electric cables within a casing, the at least one electric pilot line being connected outside said casing to at least one electric pilot line in the other electric cable or electric cables, wherein said joint is a transition joint and further comprises a barrier means disposed between the multi-core electric cable, which comprises an oil filled multi-core electric cable, and the other electric cable, which comprises a non-oil-filled multi-core electric cable, and wherein oil is contained within the casing only to the side of the barrier means closest to said oil filled cable.

5. A cable joint comprising an end portion of a multi-core electric cable, said cable having an outer sheath which surrounds at least one optical fiber line and the cores of said cable, each of the cores of the cable being electrically connected to respective cores of another electric cable or electric cables within a casing, the at least one optical fiber line being connected outside said casing to at least one optical fiber line in the other electric cable or electric cables, wherein said joint is a electric cable, which comprises an oil filled multi-core electric cable, and the other electric cable, which comprises a non-oil-filled multi-core electric cable, and wherein oil is contained within the casing only to the side of the barrier means closest to said oil filled cable.

6. A cable joint comprising an end portion of a multi-core electric cable, said cable having an outer sheath which surrounds a tube for at least one electric pilot line and the cores of said cable, each of the cores of the cable being electrically connected to respective cores of another electric cable or electric cables within a casing, the tube being connected outside said casing to a tube in the other electric cable or electric cables, wherein said joint is a transition joint and further comprises a barrier means disposed between the multi-core electric cable, which comprises an oil filled multi-core electric cable, and the other electric cable, which comprises a non-oil-filled multi-core electric cable, and wherein oil is contained within the casing only to the side of the barrier means closest to said oil filled cable.

7. A cable joint comprising an end portion of a multi-core electric cable, said cable having an outer sheath which surrounds a tube for at least one[ ] optical fiber line and the cores of said cable, each of the cores of the cable being electrically connected to respective cores of another electric cable or electric cables within a casing, the tube being connected outside said casing to a tube in the other electric cable or electric cables, wherein said joint is a transition joint and further comprises a barrier means disposed between the multi-core electric cable, which comprises an oil filled multi-core electric cable, and the other electric cable, which comprises a non-oil-filled multi-core electric cable, and wherein oil is contained within the casing only to the side of the barrier means closest to said oil filled cable.

8. A cable joint comprising an end portion of a multi-core oil filled electric cable, said cable having an outer sheath which surrounds at least one electric pilot line and the cores of said cable, each of the cores of the cable being electrically connected to respective cores of another electric cable or electric cables within an oil-filled casing, the at least one electric pilot line being connected outside said casing to at least one electric pilot line in the other electric cable or electric cables, wherein said casing comprises a first casing portion for encasing connections between said cores; an end casing portion for encasing the cores and the at least one electric pilot line; and a stepped portion interconnecting said first casing portion and said end casing portion, wherein the at least one electric pilot line extends through the stepped portion.

9. A cable joint comprising an end portion of a multi-core oil filled electric cable, said cable having an outer sheath which surrounds at least one optical fiber line and the cores of said cable, each of the cores of the cable being electrically connected to respective cores of another electric cable or electric cables within an oil-filled casing, the at least one optical fiber line being connected outside said casing to at least one optical fiber line in the other electric cable or electric cables, wherein said casing comprises a first casing portion for encasing connections between said cores; an end casing portion for encasing the cores and the at least one optical fiber line; and a stepped portion interconnecting said first casing portion and said end casing portion, wherein the at least one optical fiber line extends through the stepped portion.

10. A joint as claimed in claim 9, wherein the stepped portion is provided by a flange which extends laterally, relative to a longitudinal axis of the casing, between adjacent respective ends of said first casing portion and said end casing portion.

11. A joint as claimed in claim 10, wherein the flange extends substantially perpendicularly to the longitudinal axis of the casing such that the stepped portion comprises three segment-shaped steps.

12. A joint as claimed in claim 9, wherein the end casing portion has an inwardly facing surface which extends in the direction of a longitudinal axis of the casing, said inwardly facing surface having a substantially circular cross section taken laterally of said longitudinal axis of the casing.

13. A joint as claimed in claim 9, wherein the first casing portion has an outwardly facing surface which extends in the direction of a longitudinal axis of the casing, said outwardly facing surface having a cross section, taken laterally of said longitudinal axis of the casing, in the form of a substantially equilateral three sided figure, each side of the figure having a substantially straight side-portion intermediate arcuate end side-portions.

14. A joint as claimed in claim 9, wherein the end casing portion has an inwardly facing surface which extends in the direction of a longitudinal axis of the casing, said inwardly facing surface having a substantially circular cross section taken laterally of said longitudinal axis of the casing;

wherein the first casing portion has an outwardly facing surface which extends in the direction of said longitudinal axis of the casing, said outwardly facing surface having a cross section, taken laterally of said longitudinal axis of the casing, in the form of a substantially equilateral three sided figure, each side of the figure having a substantially straight side-portion intermediate arcuate end side-portions; and wherein said first casing portion and said end casing portion are i) disposed such that the geometrical centres of their respective lateral cross sections are aligned in the direction of the longitudinal axis of the casing, and ii) dimensioned such that, if their respective lateral cross sections are superimposed one upon the other, the substantially circular lateral cross section of the end casing portion circumscribes the three sided figure formed by the first casing portion in lateral cross section.

15. A joint as claimed in claim 9, further comprising a second end casing portion and a second stepped portion, which interconnects said first casing portion and said second end casing portion, wherein said first casing portion is disposed between the end casing portion and the second end casing portion.

16. A joint as claimed in claim 15, wherein said joint is a straight-through joint and comprises a second end portion of another multi-core oil filled electric cable in addition to the end portion of the multi-core oil filled electric cable, respective conductors of the cores of the respective cable end portions extending within the first casing portion, and the at least one optical fiber line of each of the respective cable end portions extending through a respective one of said stepped portions.

17. A joint as claimed in claim 16, wherein respective cores of respective multi-core oil-filled electric cables are connected together using ferrules.

18. A joint as claimed in claim 15, wherein said joint is a branch joint and, in addition to the end portion of said multi-core oil filled electric cable, the other electric cables comprise end portions of a plurality of single core oil filled electric cables, wherein respective conductors of the cores of the respective multi-core and single core cable end portions extend within the first casing portion, the at least one optical fiber line of said multi-core cable extends through one of said stepped portion or said second stepped portion, and any optical fiber line associated with said single core cables extends through the other of said stepped portion or said second stepped portion.

19. A joint as claimed in claim 15, wherein said joint is a stop joint and comprises a second end portion of another multi-core oil filled electric cable in addition to the end portion of the multi-core oil filled electric cable, respective cores of the end portion and the second end portion being connected to opposite ends of respective electrodes which extend within said first casing portion, and the at least one optical fiber line of each of the respective cable end portions extending through a respective one of said stepped portions.

20. A joint as claimed in claim 19, wherein the first casing portion comprises two casing sections connected to opposite ends of barrier means, said electrodes extending through said barrier means within said first casing portion.

21. A cable installation having at least one cable joint as claimed in claim 9.

22. A cable joint comprising an end portion of a multi-core oil filled electric cable, said cable having an outer sheath which surrounds a tube for at least one electric pilot line and the cores of said cable, each of the cores of the cable being electrically connected to respective cores of another electric cable or electric cables within an oil-filled casing, the tube being connected outside said casing to a tube in the other electric cable or electric cables, wherein said casing comprises a first casing portion for encasing connections between said cores; an end casing portion for encasing the cores; and a stepped portion interconnecting said first casing portion and said end casing portion, wherein the tube extends through the stepped portion.

23. A cable joint comprising an end portion of a multi-core oil filled electric cable, said cable having an outer sheath which surrounds a tube for at least one optical fiber line and the cores of said cable, each of the cores of the cable being electrically connected to respective cores of another electric cable or electric cables within an oil-filled casing, the tube being connected outside said casing to a tube in the other electric cable or electric cables, wherein said casing comprises a first casing portion for encasing connections between said cores; an end casing portion for encasing the cores; and a stepped portion interconnecting said first casing portion and said end casing portion, wherein the tube extends through the stepped portion.

* * * * *

UNITED STATES PATENT AND TRADEMARK OFFICE
CERTIFICATE OF CORRECTION

PATENT NO.     : 6,281,431 B1
DATED          : August 28, 2001
INVENTOR(S)    : Roy Alan Frank Cumley It is certified that error appears in the above-identified patent and that said Letters Patent is hereby corrected as shown below:

<u>Title page,</u>
Item [73], in the Assignee, "Birelli" should read -- Pirelli --.

<u>Column 8,</u>
Line 59, after "at least one", delete "[]"

Signed and Sealed this

Eighteenth Day of June, 2002

Attest:

JAMES E. ROGAN
Attesting Officer
Director of the United States Patent and Trademark Office